Patented Jan. 19, 1937

2,068,415

UNITED STATES PATENT OFFICE 2,068,415

PURIFICATION OF ALCOHOLS

Kenneth H. Klipstein, Short Hills, N. J., assignor to The Calco Chemical Co., Inc., Bound Brook, N. J., a corporation of Delaware No Drawing. Application May 18, 1935, Serial No. 22,219

10 Claims. (Cl. 260—98)

This invention relates to the purification of phenylethyl alcohol and to new esters of phenylethyl alcohol.

Phenylethyl alcohol is used mainly as a constituent in perfumes for which purpose, of course, it requires an extraordinarily high degree of purity because even slight traces of impurities seriously affect the odor and render the alcohol unsuitable for use. Phenylethyl alcohol may be prepared synthetically from benzene and ethylene oxide in the presence of anhydrous aluminum chloride. This process does not produce a completely pure product, a number of impurities being present such as, for example, hydrocarbons like dibenzyl and phenylethyl chloride. Most of these impurities are harsh smelling and must be removed completely. It is not practicable to remove impurities by distillation processes as the boiling points of the impurities are too close to that of the alcohol to permit satisfactory separation.

It has been proposed in the past to remove impurities by forming the addition product of phenylethyl alcohol and calcium chloride, but this process is unwieldy and the purification is not sufficiently complete. It has also been proposed to form the sodium salt of the phthalic acid half ester of phenylethyl alcohol and steam distill the impurities. This process, however, results in serious losses of phenylethyl alcohol as the ester tends to hydrolyze.

According to the present invention, the phenylethyl alcohol is reacted with an acid which forms a sufficiently stable ester of sufficiently high boiling point so that the impurities may be distilled off. Such acids are phthalic, maleic, fumaric, succinic, oxalic, and similar dicarboxylic acids, stearic, benzoylbenzoic and particularly boric acid. While all of these acids may be used, boric acid is particularly useful and constitutes the preferred reagent. The properties of the phenylethyl borate are unique in that, despite the resistance to decomposition at high temperatures, the boric ester can be hydrolyzed by hot water alone without the use of alkalis which sometimes tend to affect the delicate odor of the alcohol. Therefore, boric acid is the preferred reagent in the practice of the present invention. The esters of phenylethyl alcohol with the acids referred to above are new chemical compounds and in more specific aspects of the invention they are included as new products.

The esterification of the alcohol may be with the acid or with an anhydride or with other esters which are capable of reacting with phenylethyl alcohol to give the ester of the latter. Thus, for example, in the case of boric acid, the acid itself may be used, the anhydride or salt of the ester such as, for example, tributyl borate. The use of boric acid has the additional advantage that 1 mol. of boric acid unites with 3 mols of phenylethyl alcohol, reducing the reagent cost. The esterification may take place in any of the usual ways with or without a diluent such as benzene, which removes water azeotropically.

The invention will be described in conjunction with the following specific examples. The parts are by weight.

Example 1

366 parts of crude phenylethyl alcohol obtained by synthesis from benzene and ethylene oxide in the presence of anhydrous aluminum chloride, are mixed with 62 parts of 100% boric acid and 330 parts of benzene. The batch is refluxed for from 5 to 9 hours, water being removed azeotropically by the benzene in the usual manner. After the batch is complete the majority of the benzene is removed by distillation and then the impurities, in the residue are removed by vacuum distillation or sublimation using a current of dry inert gas such as air or nitrogen. A temperature of approximately 195° C. and pressure of about 10 mm. absolute are suitable. The boiling point of the ester is about 215° C. at 1 mm. pressure and there is therefore practically no loss of ester, whereas the impurities are removed in the stream of the inert gas. The purified boric ester is then hydrolyzed with hot water and the phenylethyl alcohol separated and vacuum distilled.

Example 2

Phenylethyl alcohol is esterified with maleic anhydride using the same conditions as in Example 1, the amount of maleic acid being sufficient to form the neutral ester. The purified ester, after vacuum distillation of the impurities, is then hydrolyzed at moderate temperature with an alkali solution.

Example 3

Phenylethyl alcohol is esterified with tributyl borate instead of boric acid and the ester purified as in Example 1.

Example 4

Phenylethyl alcohol is esterified with phthalic anhydride using the same conditions as in Example 1, the amount of phthalic anhydride being sufficient to form the neutral ester. The purified ester, after vacuum distillation of the impurities, is then hydrolyzed at moderate temperature with an alkali solution and the phenylethyl alcohol separated.

I claim:—

1. A method of purifying phenylethyl alcohol which comprises forming a stable, relatively non-volatile phenylethyl ester of an acid, removing impurities by vacuum distillation, hydrolyzing the ester and recovering the phenylethyl alcohol.

2. A method of purifying phenylethyl alcohol which comprises forming a phenylethyl ester of an acid taken from the group consisting of boric acid, phthalic acid, maleic acid, fumaric acid, succinic acid and oxalic acid, removing impurities by vacuum distillation, hydrolyzing the ester and recovering the phenylethyl alcohol.

3. A method of purifying phenylethyl alcohol which comprises forming the triphenylethyl borate, removing impurities by vacuum distillation, hydrolyzing the ester and recovering the phenylethyl alcohol set free.

4. A method according to claim 3 in which the hydrolysis is effected in the absence of alkali.

5. A method of purifying phenylethyl alcohol which comprises esterifying phenylethyl alcohol with a compound capable of yielding the boric ester in the presence of a low boiling, inert diluent, removing water during esterification by azeotropically distilling with the vapors of the diluent, distilling off the major portion of the diluent, removing the residue of the diluent and impurities by fractional distillation under reduced vapor pressure in the absence of water, hydrolyzing the borate and recovering the phenylethyl alcohol set free.

6. A method according to claim 5 in which the diluent is a benzene hydrocarbon.

7. A method according to claim 5 in which the borate is hydrolyzed by hot water in the absence of alkali.

8. A method according to claim 5 in which the fractional distillation of impurities takes place in the presence of a current of dry inert gas.

9. A method according to claim 5 in which the fractional distillation of impurities takes place in the presence of a current of dry inert gas.

10. As a new compound, triphenylethyl borate.

KENNETH H. KLIPSTEIN.